United States Patent [19]
Roura

[11] Patent Number: 4,478,978
[45] Date of Patent: Oct. 23, 1984

[54] TOUGHENED POLYAMIDE BLENDS

[75] Inventor: Miguel J. Roura, Parkersburg, W. Va.

[73] Assignee: E. I. Du Pont de Nemours and Company, Wilmington, Del.

[21] Appl. No.: 407,822

[22] Filed: Aug. 13, 1982

Related U.S. Application Data

[60] Division of Ser. No. 198,356, Oct. 20, 1980, Pat. No. 4,346,194, which is a continuation-in-part of Ser. No. 114,240, Jan. 22, 1980, abandoned.

[51] Int. Cl.$^3$ .......................... C08L 77/00; C08F 8/30
[52] U.S. Cl. ......................................... 525/66; 525/183
[58] Field of Search .................................. 525/66, 183

[56] References Cited

U.S. PATENT DOCUMENTS

| 3,264,272 | 8/1966 | Rees et al. | 525/143 |
| 3,516,961 | 6/1970 | Robb | 525/183 |
| 3,673,277 | 6/1972 | Schmitt | 525/183 |
| 3,845,163 | 10/1974 | Murch | 260/857 |
| 4,018,733 | 4/1977 | Lopez | 525/183 |
| 4,100,223 | 6/1978 | Meyer | 525/183 |
| 4,105,709 | 8/1978 | Iwami | 525/423 |
| 4,174,358 | 11/1979 | Epstein | 525/183 |
| 4,299,744 | 11/1981 | Skwart | 525/183 |
| 4,335,223 | 6/1982 | Flood et al. | 525/183 |

Primary Examiner—John C. Bleutge
Assistant Examiner—A. L. Carrillo

[57] ABSTRACT

A polyamide molding material having good impact strength at low temperature comprising a blend of 66 nylon; 6 nylon; and a toughening polymer.

3 Claims, No Drawings

TOUGHENED POLYAMIDE BLENDS

CROSS-REFERENCE TO RELATED APPLICATIONS

This is a division of application Ser. No. 198,356, filed Oct. 20, 1980 now U.S. Pat. No. 4,346,194, which is a continuation-in-part of application Ser. No. 114,240, filed Jan. 22, 1980, now abandoned.

FIELD OF THE INVENTION

This invention relates to polyamide molding materials, and more particularly to polyamide blends which are toughened by polymeric tougheners.

BACKGROUND OF THE INVENTION

Improvement of impact strength of polyamide resins has long been of interest, for resistance to shattering or brittle breaking on impact of polyamide molded articles is a desirable feature of any molded article. Tendency to break on impact in a brittle fashion (rather than ductile fashion), is a significant limitation on the usefulness of such articles. By "ductile" is meant that cracks do not tend to propagate from the area of impact, and thus a resin having good ductility is one that is resistant to crack propagation caused by impact. The ductility of an article can be measured by notched Izod test ASTM D-256-73.

A variety of additives have been added heretofore to polyamide resins to improve strength and ductility. For example, Epstein U.S. Pat. No. 4,174,358 issued Nov. 13, 1979, describes improving impact strength and ductility by adding a selected random copolymer which adheres to the polyamide. However, the tendency of polyamides in general to break on impact in a brittle fashion increases as temperatures are lowered. Thus the use of molded articles for low temperature applications, such as winter sports equipment, automobile bumpers, and the like, is decreased. It would be desirable to have a polyamide molding blend suitable for making molded articles for low temperature applications. This invention is directed to such a molding blend.

SUMMARY OF THE INVENTION

This invention provides a polyamide blend of good impact strength and ductility at low temperatures, e.g., 0° C. The blend is a polyamide blend comprising:

(a) 60–97% by weight polyamide which is a mixture of 20–80% by weight 66 nylon and complementally 80–20% by weight 6 nylon, and complementally (b) 3–40% by weight, preferably 10–30%, of a polymeric toughening agent selected from either (i) an elastomeric olefinic copolymer having carboxyl or carboxylate functionality or (ii) an ionic copolymer of at least one α-olefin and at least one α,β-unsaturated carboxylic acid which can contain a third copolymerizable monomer, in which the acid moiety is at least partially ionized with metal ions.

By "elastomeric" is meant that the copolymer after molding will assume substantially its original shape after distortion causing pressure is removed. By "olefinic" is meant terminally unsaturated monomers including dienes and the like.

By "copolymer" is meant a polymer composed of two or more different monomeric units.

It has been found that best low temperature toughness of compositions containing the polymeric toughening agent (b)(i) and (b)(ii) is achieved when a blend of 66 nylon and 6 nylon is employed. Specifically the blend must contain no less than about 20% and no more than about 80% 6 nylon. Thus, compositions containing 66 nylon alone or 6 nylon alone have lower toughening at low temperatures for a given toughener. Furthermore, the behavior of 66 and 6 nylon blends is unique in that compositions based on other nylon blends such as 6/612 or 66/612 nylon have low temperature toughness inferior to compositions containing one of the two nylon components.

DESCRIPTION OF THE INVENTION

66 Nylon and 6 nylon are commonly known and available. 66 Nylon is polyhexamethyleneadipamide, while 6 nylon is polycaprolactam. Both are high molecular weight polymers, i.e., of film-forming molecular weight.

Toughening component (b)(i) is an elastomeric, olefinic copolymer having carboxyl or carboxylate functionality. Preferably the olefinic moieties are derived from alkylene monomers of 2–8 carbons, such as ethylene, propylene, or the like. However the olefinic moieties can include a diene such as butadiene. The comonomers present can be a wide variety of copolymerizable ethylenically unsaturated monomers. Commonly, the comonomers are a lower alkyl acrylate or methacrylate, such as methyl acrylate, ethyl acrylate, or isobutyl acrylate, or other olefins or mixtures thereof. The comonomers can also be methacrylic or acrylic acid, fumaric acid, maleic anhydride, glycidyl methacrylate or the like.

In a preferred embodiment, Component (b)(i) is a polymer of ethylene, at least one $C_3$–$C_6$ α-olefin and at least one nonconjugated diene, which polymer contains carboxyl or carboxylate functionality. Propylene is normally selected as the $C_3$–$C_6$ α-olefin in preparing such polymers. Other $C_3$–$C_6$ α-olefins, namely 1-butene, 1-pentene, and 1-hexene can be selected in place of or in addition to propylene in preparing the elastomeric polymers.

Preferably the nonconjugated diene is monoreactive. Monoreactive nonconjugated dienes have one double bond which readily enters the polymerization reaction with ethylene and propylene, and a second double bond which does not, to any appreciable extent, enter the polymerization reaction. Monoreactive nonconjugated dienes include linear aliphatic dienes of at least six carbon atoms which have one terminal double bond and one internal double bond, and cyclic dienes wherein one or both of the carbon-to-carbon double bonds are part of a carbocyclic ring.

The nonconjugated diene can also be a direactive one. By "direactive" is meant that both double bonds are capable of polymerizing during preparation of the polymer. Such direactive dienes include 2,5-norbornadiene and 1,7-octadiene.

The carboxyl or carboxylate functionality is ordinarily supplied by employing as a comonomer in the copolymer an ethylenically unsaturated comonomer containing carboxyl or carboxylate groups. With respect to the preferred component (b)(i), the carboxyl or carboxylate functionality can be supplied by reacting the ethylene/$C_3$–$C_6$ α-olefin/unconjugated diene with an unsaturated compound taken from the class consisting of α,β-ethylenically unsaturated dicarboxylic acids having from 4 to 8 carbon atoms, or derivatives thereof. Such derivatives include monoesters of alcohols of 1 to 29 carbon atoms, anhydrides of the dicarboxylic acids, or the metal salts of the acids, or the monoester of the dicarboxylic acid having from 0 to 100 percent of the carboxylic acid groups ionized by neutralization with metal basic salt, and the like. Illustrative of such acids and derivatives are maleic acid, maleic anhydride, maleic acid monoethyl ester, metal salts of maleic acid monoethyl ester, fumaric acid, fumaric acid monoethyl ester, itaconic acid, vinyl benzoic acid, vinyl phthalic acid, metal salts of fumaric acid monoethyl ester, monoesters of maleic or fumaric acid or itaconic acids where the alcohol is methyl, propyl, isopropyl, butyl, isobutyl, hexyl, cyclohexyl, octyl, 2-ethyl hexyl, decyl, stearyl, methoxy ethyl, ethoxy ethyl, hydroxy or ethyl, and the like. The adducts can be prepared by any grafting process which intimately mixes the unsaturated acid or derivative with the polymer without appreciable generation of free radicals, and which concurrently or subsequently heats the mixture to a temperature whereat thermal addition occurs. Selected temperatures will generally be at least 225° C. to obtain adduct formation at acceptable rates and less than about 450° C. to avoid any excessive polymer breakdown. Preferred temperature ranges will vary with the particular polymer and can readily be determined by one skilled in the art. Mixing of the acid or derivative and polymer can be by blending in an internal mixer or extruder, or by blending finely divided dry compound with polymer on a well-ventilated rubber mill with concurrent or subsequent heating, such as in a hot press or mold. The acid or derivative can be substituted with groups, such as bromine or chlorine, which do not unduly interfere with the graft reaction.

It is generally desired to form adducts containing about 0.5 to 9 percent, and preferably about 1 to 4 percent, by weight of the acid or derivative.

Toughening component (b)(ii) is derived from an α-olefin and an unsaturated carboxylic acid, and optionally other copolymerizable comonomers. Preferably the α-olefin is ethylene and the acid is acrylic or methacrylic acid. The other copolymerizable comonomer can be an acrylate or methacrylate and the like. The metal ion can be monovalent, divalent or trivalent, as for example Na, Zn, Al, K and the like.

Representative component (b) toughening copolymers include
ethylene/isobutyl acrylate/methacrylic acid (80/10/10) 70% zinc neutralized,
butadiene/acrylonitrile with carboxyl end groups,
ethylene/methacrylate/maleic acid monoethyl ester (42/54/14),
ethylene/vinyl acetate/glycidyl methacrylate (70/25/5),
methacrylate/butyl acrylate/acrylic acid copolymer, sequentially polymerized, The blends of the present invention are prepared by admixing the ingredients in the indicated proportions and melt blending them for intimate admixture. Preferably, the 6 nylon, 66 nylon and toughening polymer or polymers are first mixed by tumbling in a drum. The melt blending typically can be conducted at a temperature above the melting point of the components and below the decomposition temperature. A temperature range of about from 260° C. to 330° C. is preferred.

The blends are particularly useful in applications in which impact strength is important at low temperatures, such as in automobile bumpers, sports equipment, safety equipment and the like.

The blends of this invention may also contain one or more conventional additives such as stabilizers and inhibitors of oxidative, thermal, and ultraviolet light degradation; lubricants and mold release agents, colorants including dyes and pigments, flame-retardants, fibrous and particulate fillers and reinforcements, plasticizers, and the like. These additives are commonly added during the mixing step.

Representative oxidative and thermal stabilizers which may be present in blends of the present invention include Group I metal halides, e.g., sodium, potassium, lithium with cuprous halides, e.g., chloride, bromide, iodide; hindered phenols, hydroquinones, and varieties of substituted members of those groups and combinations thereof.

Representative ultraviolet light stabilizers, include various substituted resorcinols, salicylates, benzotriazoles, benzophenones, and the like.

Representative lubricants and mold release agents include stearic acid, stearyl alcohol, and stearamides. Representative organic dyes include nigrosine, while representative pigments, include titanium dioxide, cadmium sulfide, cadmium selenide, phthalocyanines, ultramarine blue, carbon black, and the like. Representative fillers include carbon fibers, glass fibers, amorphous silica, asbestos, calcium silicate, aluminum silicate, magnesium carbonate, kaolin, chalk, powdered quartz, mica, feldspar, and the like.

Representative flame-retardants include organic halogenated compounds such as decabromodiphenyl ether and the like.

EXAMPLES

The present invention is further illustrated by the following specific examples, in which parts and percentages are by weight unless otherwise indicated.

In these examples, the ingredients were blended by tumbling in a drum. The mixture was then pelletized by melt blending in a Werner & Pfleiderer twin screw extruder at a barrel temperature of between 310°–320° C. and a die temperature of 290° C. Extrusion was carried out with a port open to the air or under vacuum when removing monomeric caprolactam was desired. The screw speed was 200 rpm. The resulting strand was quenched in water, cut into pellets, and sparged with nitrogen until cold to remove moisture.

Test bars ($\frac{1}{8} \times 5 \times \frac{1}{2}$ inch) were molded in 3 oz. and 6 oz. injection molding machines at melt temperatures 10° to 30° C. above the melting point of the polyamide matrix. The mold temperature was about 70° C. with fast injection and a 20/40 molding cycle (seconds ram forward/seconds hold) was employed. The molded bars were tested using the following test procedures in their dry-as-molded state:

Notched Izod Toughness:
ASTM D-256-73. In this test the bar was $\frac{1}{8} \times 3 \times \frac{1}{2}$ inch and had a 10 mil notch (radius) in the middle Tensile Strength: ASTM D-638-58T
Elongation: ASTM D-638-58T
Flexural Modulus: ASTM D-790-58T In the Examples, the 66 nylon used had a relative viscosity of about 52; while the 6 nylon used had a relative viscosity of between 75–90, tested in an 8.4% polymer solution in 90% formic acid.

EPDM used in the tables and examples stands for a copolymer composed of 72 percent ethylene, 24 percent propylene, and 4 percent 1,4-hexadiene. It is employed as an extender for the toughening polymer.

EPDM-FA stands for a toughening copolymer composed of 68% ethylene, 26% propylene, 6% 1,4-hexadiene and 0.06% 2,5-norbornadiene which is treated with fumaric acid to result in an adduct having 1.5–2.0% functionality, acid and anhydride, as measured by Infrared (CPE 671 Spectrophotometer), and 1.2–4.8 g/10 min melt flow at 280° C. through a 0.0825 in diameter orifice.

EXAMPLE 1,2 AND CONTROL A

66 Nylon, 6 nylon, EPDM and EPDM-FA were blended, pelletized, molded into test bars and tested for notched Izod values as described above. Ingredient amounts and test results are provided as follows:

TABLE 1

| | Ingredients (%) | | | | Notched Izod Test Results (ft-lbs/in) | | | |
|---|---|---|---|---|---|---|---|---|
| | 66 Nylon | 6 Nylon | EPDM-FA | EPDM | at 23° C. | at 0° C. | at −20° C. | at −40° C. |
| Control A | 81 | none | 10 | 9 | 18.2 | 10.1 | 8.5 | 2.6 |
| Example 1 | 59 | 22 | 10 | 9 | 22.3 | 19.8 | 18.1 | 7.9 |
| Example 2 | 45 | 36 | 10 | 9 | 23.7 | 21.7 | 21.0 | 12.8 |

It is seen that in each instance the resins containing 6 nylon and 66 nylon had much more impact strength as measured by this test than the control (which did not contain 6 nylon).

EXAMPLES 3, 4, AND 5 AND CONTROL B, C, D AND E

In a separate set of experiments, 66 nylon, 6 nylon, EPDM and EPDM-FA were blended, pelletized, molded into test bars and tested for notched Izod values as described above. Ingredient amounts and test results are provided as follows:

TABLE 2

| | Ingredients (%) | | | | Notched Izod Test Results (ft-lbs/in) | | | |
|---|---|---|---|---|---|---|---|---|
| | 66 Nylon | 6 Nylon | EPDM-FA | EPDM | at 23° C. | at 0° C. | at −20° C. | at −40° C. |
| Control B | 81 | none | 10 | 9 | 18.0 | 17.2 | 12.3 | 4.5 |
| Example 3 | 61 | 20 | 10 | 9 | 19.4 | 18.9 | 15.8 | 8.8 |
| Example 4 | 41 | 40 | 10 | 9 | 20.4 | 20.0 | 18.7 | 12.1 |
| Example 5 | 21 | 60 | 10 | 9 | 22.4 | 21.0 | 19.9 | 9.1 |
| Control C | 81% of copolymer made of 67.5% 66 nylon and 22.5% 6 nylon | | 10 | 9 | 17.2 | 15.3 | 13.9 | 3.0 |
| Control D | 81% of copolymer made of 90% 66 nylon and 10% 6 nylon | | 10 | 9 | 17.6 | 16.2 | 7.0 | 3.6 |
| Control E | none | 81 | 10 | 9 | 17.0 | 14.3 | 13.4 | 3.6 |

It is seen that neither 66 nylon alone or 6 nylon alone, nor the copolymers of 66 nylon and 6 nylon produced a resin having as good notched Izod strength as the mixtures of 66 and 6 nylon shown in Examples 3, 4 and 5.

EXAMPLE 6 AND CONTROL F

The resins described in the table below were prepared, molded and tested as described above, except that a flame retardant system of 20% polydibromophenylene oxide and 8% $Sb_2O_3$ based on weight of resin were also added.

TABLE 3

| | Ingredients | | | | Test Data | |
|---|---|---|---|---|---|---|
| | 66 Nylon | 6 Nylon | EPDM-FA | EPDM | Notched Izod ft-lbs/in at 23° C. | Flammability Test UL 94 |
| Example 6 | 26.5 | 26.5 | 10 | 9 | 15.8 | V-O |
| Control F | 53 | none | 10 | 9 | 10.4 | V-O |

It is seen that presence of 6 nylon increases the strength when flame retardant is present.

EXAMPLE 7 AND CONTROL G

The following resins were prepared as described above:

TABLE 4

| | 66 Nylon | 6 Nylon | EPDN-FA | EPDM |
|---|---|---|---|---|
| Example 7 | 35.75 | 35.75 | 13.5 | 15 |
| Control G | 71.5 | none | 13.5 | 15 |

67% of each was compounded with 33% chopped glass fiber in a 2½ inch Sterling single screw extruder, and the resulting test bars subjected to the notched Izod test with the following results:

| | Test Data |
|---|---|
| | Notched Izod, ft-lbs/in at 23° C. |
| Example 7 | 6.9 |
| Control G | 6.2 |

It is seen that presence of 6 nylon increases the strength when chopped glass is present.

EXAMPLE 8 AND CONTROLS H AND I

The following resins were prepared, molded and tested for notched Izod toughness, as described in the general directions further above.

| Toughening Polymer Butadiene/ Acrylonitrile with carboxyl end groups (%) | 6 nylon % | 66 nylon % | Notched Izod (ft-lbs/in) | |
|---|---|---|---|---|
| | | | 23° C. | 0° C. |
| Control H | 15 | 0 | 85 | 3.5 | 2.83 |
| Control I | 15 | 85 | 0 | 15.3 | 2.95 |
| Example 8 | 15 | 50 | 35 | 14.6 | 3.18 |

EXAMPLE 9 AND CONTROLS J AND K

The following resins were prepared, molded and tested for notched Izod toughness, as described in the general directions further above.

| Toughening Polymer Ethylene/Iso-butyl acrylate/ Methacrylic Acid (80/10/10) 70% Zn neutralized (%) | 6 nylon % | 66 nylon % | Notched Izod (ft-lbs/in) | |
|---|---|---|---|---|
| | | | 23° C. | 0° C. |
| Control J | 30 | 0 | 70 | 14.3 | 2.50 |
| Example 9A | 30 | 26 | 44 | 20.6 | 3.33 |
| Example 9B | 30 | 38 | 32 | 23.1 | 3.32 |
| Example 9C | 30 | 50 | 20 | 24.7 | 3.47 |
| Control K | 30 | 70 | 0 | 24.0 | 2.85 |

EXAMPLE 10 AND CONTROLS L AND M

The following resins were prepared, molded and tested for notched Izod toughness, as described in the general directions further above.

| Toughening Polymer Ethylene/ Methacrylate/Maleic Acid Mono-ethylester (42/54/14) | 6 nylon % | 66 nylon % | Notched Izod (ft-lbs/in) | | |
|---|---|---|---|---|---|
| | | | 23° C. | 0° C. | −20° C. |
| Control L | 20 | 0 | 80 | 4.06 | 3.9 | 3.06 |
| Example 10 | 20 | 50 | 30 | 19.68 | 4.83 | 3.82 |
| Control M | 20 | 80 | 0 | 22.27 | 3.67 | 3.06 |

I claim:
1. A thermoplastic polyamide blend comprising:
   (a) 60-97% by weight of a thermoplastic polyamide which is a mixture of 20-80% by weight 66 nylon and complementally 80-20% by weight 6 nylon, and complementally
   (b) 3-40% by weight of a polymeric, toughening agent that is an ionic copolymer of at least one α-olefin and at least one α,β-unsaturated carboxylic acid which can contain a third copolymerizable monomer, in which the acid moiety is at least partially ionized by neutralizing with metal basic salts.
2. The blend of claim 1 wherein component (b) is a copolymer of ethylene/isobutyl acrylate/methacrylic acid that is 70 zinc neutralized.
3. Process for preparing the resin of claim 1 wherein the components are physically mixed and then melt compounded.

* * * * *